United States Patent

[11] 3,575,444

[72] Inventors James Veenema
 245 Arbor Road, Franklin Lakes, 07417;
 Fred Muller, Jr., 120 Ridgedale Ave.,
 Florham Park, 07932; John A. Johnson,
 9 Sheridan Drive, Short Hills, N.J. 07078
[21] Appl. No. 779,708
[22] Filed Nov. 29, 1968
[45] Patented Apr. 20, 1971

[54] SEMITRAILER DOLLY AND TRACKING TRAILER FOR FREIGHT CONTAINERS
 11 Claims, 12 Drawing Figs.
[52] U.S. Cl...................................................... 280/408,
 280/418, 280/442, 296/35
[51] Int. Cl......................................................... B62d 53/00
[50] Field of Search........................................... 280/408,
 418, 442; 296/35, 35 (.1); 105/366 (.8)

[56] References Cited
 UNITED STATES PATENTS
| | | | |
|---|---|---|---|
| 642,394 | 1/1900 | Watkins | 280/442X |
| 1,892,004 | 12/1932 | Reid | 280/418 |
| 2,124,947 | 7/1938 | Henderson | 280/442 |
| 2,461,577 | 2/1949 | Stark | 296/27 |
| 2,590,962 | 4/1952 | Gurton et al | 280/408 |
| 3,111,341 | 11/1963 | Fujoka et al | 296/35 |
| 3,219,218 | 11/1965 | Hand | 296/35(.1)X |
| 3,296,981 | 1/1967 | Bergstrand | 105/366(.8) |

FOREIGN PATENTS

| 1,053,968 | 1/1967 | Great Britain | 280/408 |
|---|---|---|---|

Primary Examiner—Leo Friaglia
Attorney—Lawrence I. Lerner

ABSTRACT: A dolly is provided for supporting and connecting a semitrailer to a towing vehicle and particularly to a preceding semitrailer or trailer to form a train of trailers. Each dolly comprises crossed towing bars for effecting absolute tracking of a semitrailer and fifth wheel means for engaging a semitrailer. A tracking trailer for freight containers is also provided, the tracking trailer having crossed towing bars for connection to a towing vehicle. The invention also resides in the provision of towing bars for the tracking trailer and dolly of a size and weight which permits for manual handling thereof. In addition, guide plates are provided which are substantially triangular in cross section and are adapted to align and position containers on a semitrailer or trailer.

Patented April 20, 1971  3,575,444

INVENTORS:
JAMES VEENEMA
FRED MULLER, JR.
JOHN ALGOT JOHNSON
BY
ATTORNEY

Patented April 20, 1971 3,575,444

INVENTORS:
JAMES VEENEMA
FRED MULLER, JR.
BY  JOHN ALGOT JOHNSON

ATTORNEY

Patented April 20, 1971

INVENTORS:
JAMES VEENEMA
FRED MULLER, JR.
BY  JOHN ALGOT JOHNSON

ATTORNEY

Patented April 20, 1971 3,575,444

INVENTORS:
JAMES VEENEMA
FRED MULLER, JR.
BY  JOHN ALGOT JOHNSON

*Lawrence I. Lerner*

ATTORNEY

SEMITRAILER DOLLY AND TRACKING TRAILER FOR FREIGHT CONTAINERS

BACKGROUND OF THE INVENTION

This invention was made in connection with the development of a semitrailer or trailer for freight containers which could be used in a train of trailers and/or semitrailers for transporting containers from a point of arrival to storage area. In the past, it was common to load a trailer or semitrailer and then, if the goods were to be shipped by sea, rail, airplane, barge or other form of transportation before reaching their final destination, unload the trailer or semitrailer when reaching the point of departure of the further transporting means for loading onto the further transporting means.

Great savings in time and expense have been effected by the use of "door-to-door" containerization which has been achieved by using trailers or semitrailers which mount independent containers. The independent containers can be removed from the trailer or semitrailer as a unit and mounted on or in the next means of transportation. For example, it is common to load a ship by using cranes which pick containers off trailers and/or semitrailers and position them in the hold of the ship. Unloading is effected by removing the containers from the hold and placing them on the dock or waiting trailers and/or semitrailers. Preferably, the containers are loaded on trailers or semitrailers directly.

It has been found that ships can be loaded and unloaded more rapidly than the trailers or semitrailers can be moved into loading positions. Further, a separate cab or tractor and its driver has been required for each trailer or semitrailer. It has been proposed that a single tractor be used to pull a plurality of trailers and/or semitrailers to save costs, time and space.

It is already known that two or more trailers can be pulled by a single tractor. Such "double-bottom" transportation is presently only permitted on expressways which are relatively straight. The "double-bottom" concept would not be feasible in a docking or loading and storage area due to the fact that turning of a train of two or more trailers and/or semitrailers in tandem requires a very large area. For example, when a tractor with four trailers turns a corner, the tractor uses a certain area defined by a certain radius or arc. The trailer directly connected to the tractor turns in a somewhat larger arc. The next succeeding tailer turns in yet a larger arc, and this phenomenon continues until the last trailer needs a very large corner indeed. Thus, since the towed vehicles do not track, the "double-bottom" method was deemed not to be feasible for the present purposes.

SUMMARY

The term "trailer" is used herein to describe a vehicle capable of being towed which is fully mounted on wheels so that it need not also be supported while being towed. The term "semitrailer" is used to describe a vehicle which has wheels mounting the rear portion and, in order to be towed, requires that the front portion be supported. The expression "fifth wheel means" is used herein in the sense well known in the art to describe the means by which a tractor is connected to a semitrailer.

This invention resides in the provision of a tracking trailer for freight containers and a dolly for a semitrailer each of which has crossed towing bars for causing the trailer or semitrailer to track behind a towing vehicle. The towing bars are of a weight which permits manual handling thereof and may be connected directly to a tractor or to a preceding trailer or semitrailer. The dolly is provided with fifth wheel means for engaging a semitrailer.

The use of crossed towing bars for effecting tracking of a towed vehicle is known; see, for example, U.S. Pat. Nos. 1,990,484; 2,124,947; and 2,313,235. Nevertheless, the problem of providing a train of trailers and/or semitrailers which could be towed by a single tractor and be maneuvered in a small area has remained unsolved. Perhaps the principal reason that this problem has remained unsolved is that those skilled in the art, if they even contemplated the use of towing bars, assumed that they would not be feasible as will be explained more fully.

Semitrailers and trailers which are used for the shipment of freight by independent freight containers are usually 20 to 40 feet long and carry loads often in excess of 50,000 pounds. A train of five such trailers could easily weigh in excess of 375,000 pounds. Thus, if one considered the use of towing bars for connecting the trailers and/or semitrailers, one would immediately assume that such towing bars must be quite strong and therefore quite bulky and heavy. For a connecting means between trailers to be feasible, it must be one that can be manually handled. Towing bars which could accommodate the compressive-tensile and bending loads assumed to be incurred would be too bulky and heavy to be manually handled.

The present invention resides in the provision of towing bars for trailers for freight containers and semitrailers which can be manually connected to and disconnected from a towing vehicle. It was found that towing bars for trailers for freight containers and semitrailers for freight containers need not be capable of withstanding nearly as large bending forces as the tensile-compression forces that they must handle since such trailers or semitrailers are used in areas of relatively level grade. Storage areas adjacent points of arrival are usually quite level, only slight grades being present and no hills. For example, docking areas and the areas around a railroad freight yard are usually quite level. With this in mind, towing bars were developed which could resist large tensile-compression forces but which could not resist as large bending forces and which could be manually handled. A preferred embodiment of such towing bars is made of steel and comprises a hollow central portion.

The invention further resides in the provision of guide plates for the semitrailer or trailer beds which aid in aligning and mounting different type containers on the beds. The guide plates are mounted for movement to an inoperative position below the bed or to an operative position above the bed. When in the operative position, the guide plates present sloping surfaces which are engaged by the freight containers and guide them into position. The guide plates have substantially triangular cross sections.

BRIEF DESCRIPTION OF THE DRAWING

The objects and features of the invention will become more apparent by reference to the following description taken in conjunction with the accompanying drawing, in which.

DESCRIPTION OF THE PREFERRED EMBODIMENT

Figure 2:
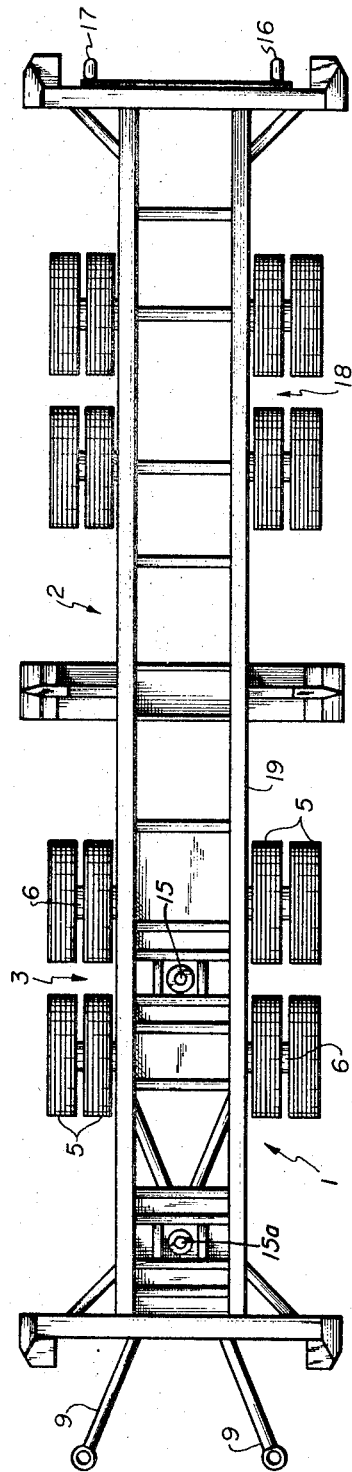
FIG. 2 is a plan view of the semitrailer and dolly of FIG. 1.
Figure 1:
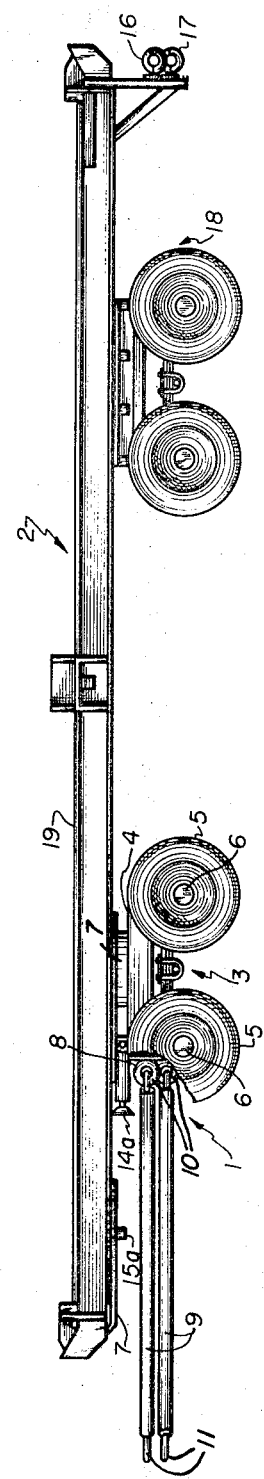
FIG. 1 is a side elevational view of a semitrailer attached to a dolly in accordance with the invention.

Referring to FIGS. 1 and 2, a dolly 1 in accordance with the invention is shown attached to a semitrailer 2 by fifth wheel means 3. The semitrailer comprises a flat bed 19 adapted to receive independent containers of the "door-to-door" containerization type and has the usual rear wheel assembly 18 which is fixed relative to the trailer bed.

The dolly 1 comprises a chassis 4 and wheels 5 mounted on axles 6. The chassis includes fifth wheel engagement means 7 for engaging a kingpin or pivot means 15 projecting downwardly from the bottom of the semitrailer 2. Kingpin 15 is spaced from the kingpin 15a of the semitrailer. Such means are well known in the art and are not specifically illustrated or described. The semitrailer 2 has a folding support 14a for supporting the front end of the semitrailer when it is not connected to a tractor or dolly. Where the kingpin 15a is normally 2 feet 6 inches from the front end of the semitrailer, kingpin 15 is 11 feet from the front end of the semitrailer.

Pintle hooks 8 are connected to one end of the chassis at spaced-apart points. It will be noted from viewing FIG. 1 that the pintle hooks 8 are disposed on opposite sides of the longitudinal axis of the trailer 2 when the dolly is connected to the trailer. It will be noted from viewing FIG. 1 that the pintle hooks are disposed at different levels with respect to the chassis.

The dolly further comprises towing bars 9. Each towing bar has tow rings 10 and 11 attached to its ends. The tow rings 10 at the inward end of each bar are pivotally connected to the chassis by engagement with the pintle hooks 8. As illustrated, the towing bars are crossed. Such crossing is accommodated by the positioning of the connections of the rings 10 to the chassis at different levels of the chassis and the spacing and pivotal connection of the tow rings 10. The tow rings 11 on the outward ends of the towing bars 9 when connected to a towing vehicle are pivotally connected thereto at levels corresponding to the levels of connection of the tow rings 10 to the chassis 4.

As noted previously, semitrailers with which the present dollies are intended for use are usually about 40 feet long. In the preferred embodiment of the invention, each towing bar from the center of each tow ring to the center of the other tow ring is 12 feet long. The distance between the axis of the pivotal connection of the fifth wheel engagement and the forward end 12 of the semitrailer is about 11 feet. The distance between the axis of the fifth wheel means and the center of the pintle hooks 8 is 3 feet. The towing bars when crossed extend beyond the end of the trailer a distance which is approximately 2 feet.

Towing bars weighing more than about 200 pounds cannot be easily manually handled. It will be appreciated that a towing bar weighing 200 pounds and connected at one end to a pintle hook requires a lifting force of only 100 pounds at the outward end since an upward force of 100 pounds will be present at the engagement of the towing bar with the pintle hook.

Figure 3:
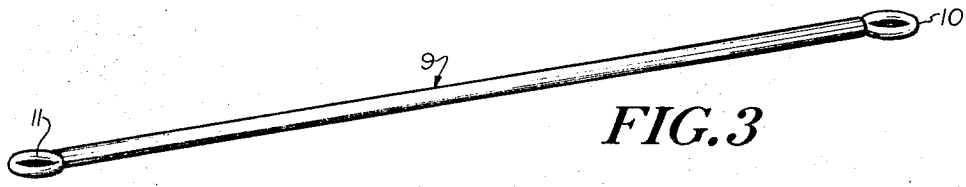
FIG. 3 is a perspective view of a towing bar in accordance with the invention.
Figure 4:
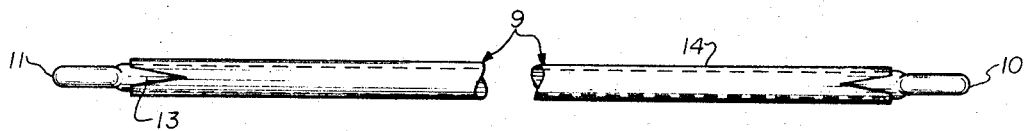
FIG. 4 is a side elevational view of the towing bar of FIG. 3.
Figure 5:
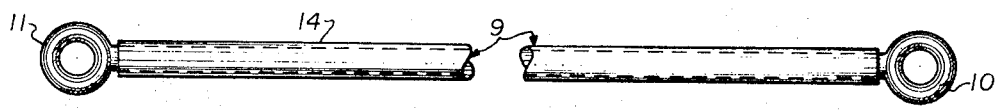
FIG. 5 is a plan view of the towing bar of FIG. 3.

Reference will now be made to FIGS. 3, 4 and 5 in which a preferred embodiment of a towing bar 9 is illustrated. It will be noted that the body 14 of the towing bar 9 is hollow along its entire length. The ends 13 of the tow rings are inserted into the ends of the towing bar.

A specific preferred embodiment of the towing bar is made of a steel of high tensile-compression strength and has a total of approximately 100,000 pounds tensile-compression strength. The outside diameter of the bar is 2¾ inches. The inside diameter is 2 5/16 inches leaving a total radial thickness of seven-sixteenths of an inch. Though the said towing bar is over 12 feet long when including the length of its tow rings, it weighs less than 200 pounds. This has been achieved by the provision of the central hollow portion. The bending forces necessary to bend the said towing bar are much less than that which could cause damage due to excessive tensile-compression forces. However, towing bars as described have been used in practice and have been found to be completely satisfactory and to provide for absolute tracking.

The towing bars have also been found to be easily manually connected to and disconnected from a preceding towing vehicle. This is due to the relative lightweight of the towing bars which has been made possible by the unique realization that the bending forces in an area of substantially level grade would be much less than the tensile-compression forces that the towing bar is subjected to. In this regard, the weight of a loaded semitrailer often exceeds 50,000 pounds. When four of five semitrailers are being towed loads exceeding 375,000 pounds may be towed which loads can be easily accommodated by two towing bars each having a total tensile-compression strength of 100,000 pounds.

Figure 6:
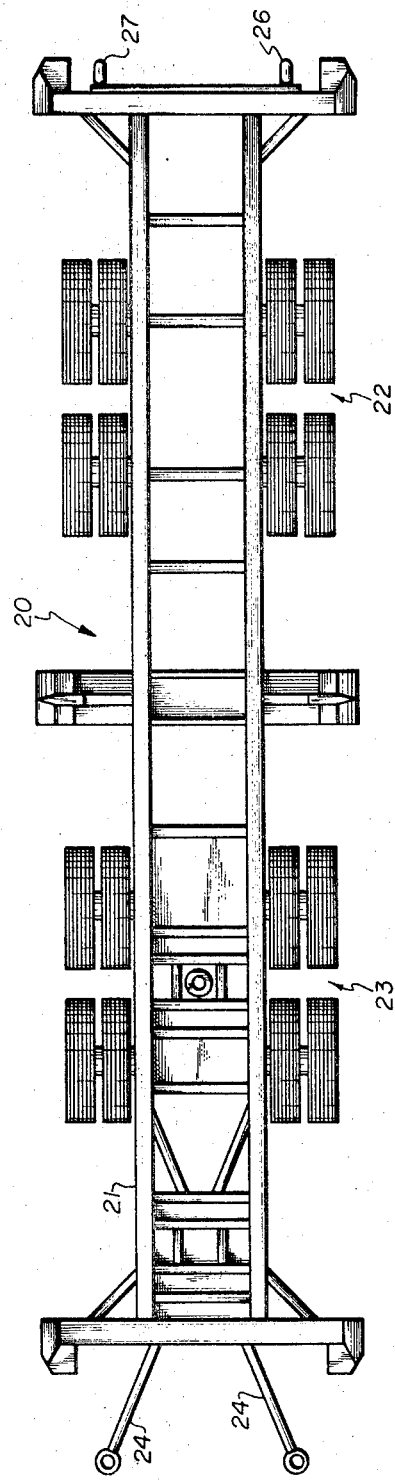
FIG. 6 is a plan view of a tracking trailer in accordance with the invention.
Figure 7:
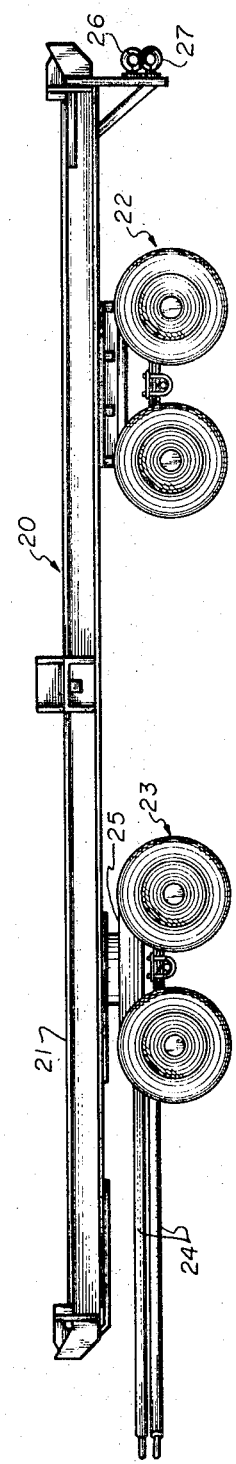
FIG. 7 is a side elevational view of the trailer of FIG. 6.
Figure 9:
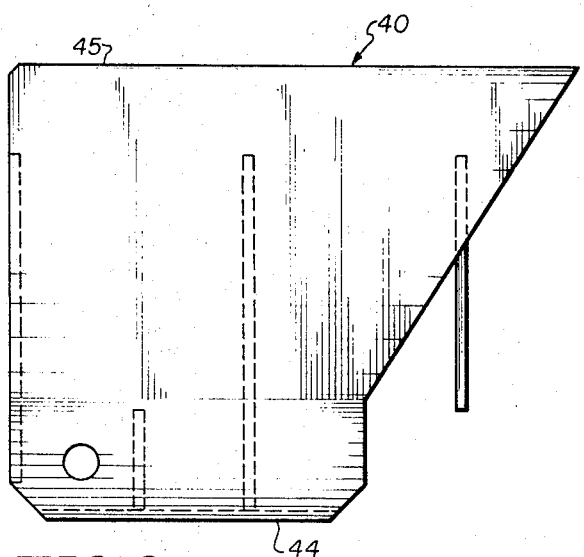
FIG. 9 is a side elevational view of a guide plate in accordance with the invention.
Figure 10:
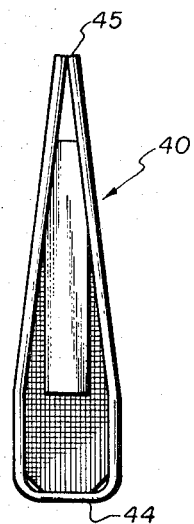
FIG. 10 is a front elevational view of the guide plate of FIG. 9.
Figure 11:
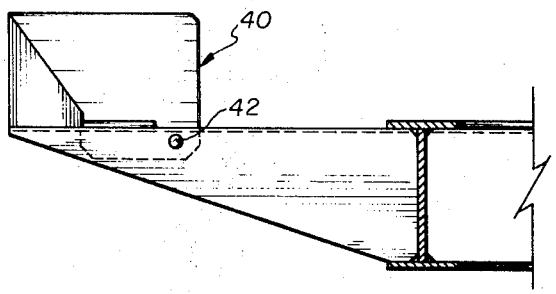
FIG. 11 illustrates the mounting of the guide plate of FIGS. 9 and 10 on a crossmember of a tailer bed; and, FIG. 12 is a schematic illustration of a preferred manner of pivotally connecting the guide plate of FIGS. 9 and 10 to a trailer bed.
Figure 11:
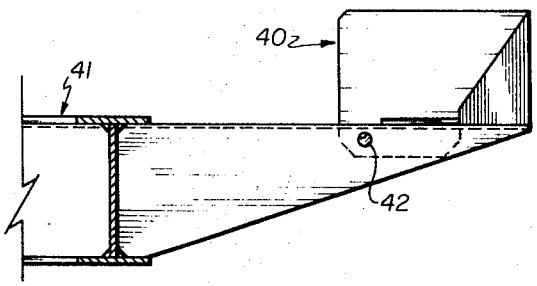
Figure 12:
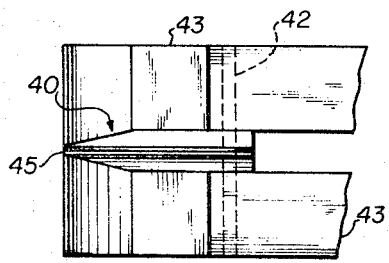

Referring now to FIGS. 6 and 7, a tracking trailer 20 for freight containers in accordance with the invention is shown. The tracking trailer comprises a conventional flatbed 21 and a rear wheel assembly 22 similar to the semitrailer rear wheel assembly 18. The trailer bed 21 is, similar to the semitrailer bed 19, adapted to receive independent freight containers of the "door-to-door" containerization type. A forward wheel assembly 23 is rotatably connected to the trailer bed by means well known in the art. The rear wheel assembly is not rotatable relative to the trailer bed.

Towing bars 24 similar to the towing bars 9 of the dolly 1 of FIGS. 1 and 2 are connected to the frame 25 of the forward wheel assembly in the same manner that the towing bars 9 are connected to the chassis 4 of the dolly. Thus, the towing bars 24 are adapted to be crossed for connection to a towing vehicle.

Pintle hooks 26 and 27 are mounted on the rear end of the trailer 20 and are adapted for engagement by the towing bars of a dolly or tracking trailer to be towed by the trailer 20. The semitrailer 2 shown in FIGS. 1 and 2 may be provided with similar pintle hooks 16 and 17.

Figure 8:
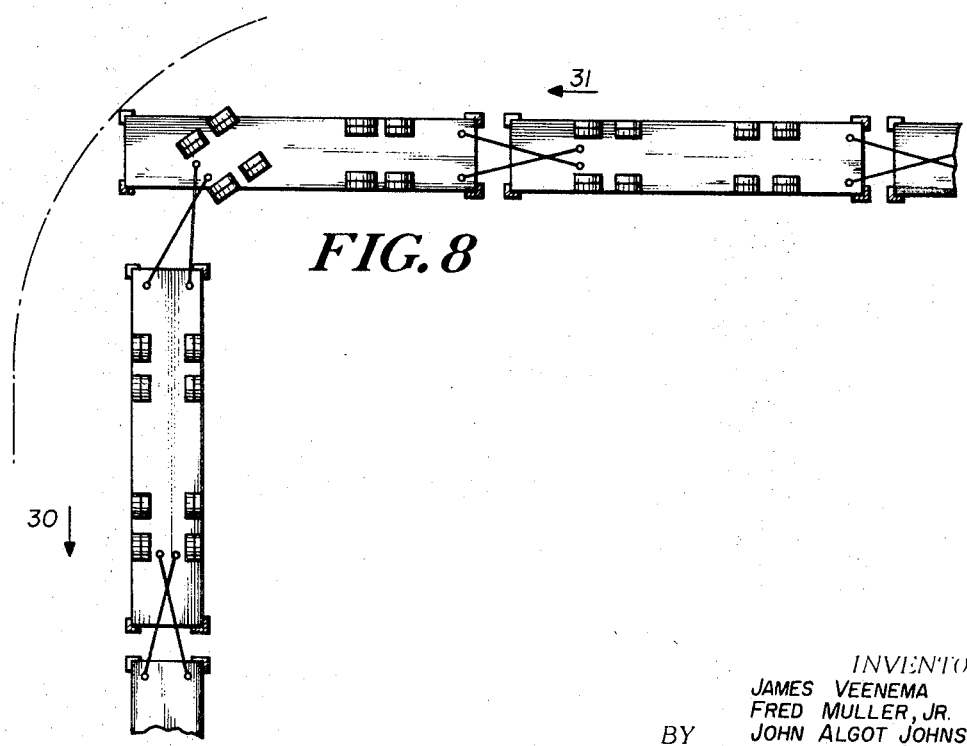
FIG. 8 is a schematic illustration of a train of tracking trailers in accordance with the invention tracking behind a towing vehicle.

Referring to FIG. 8, a schematic illustration of the movement of a train of trailers and/or semitrailers towed in the directions of the arrows 30, 31 is shown. It has been found in practice and may be appreciated by a study of FIG. 8 that whether you have two or more trailers and/or semitrailers in the train, they can turn any corner that a tractor trailer can turn. Thus, the present invention enables a train of tracking trailers and/or semitrailers to be operated and maneuvered in a container storage area with little or no difficulty.

Semitrailers or trailers of the type described and illustrated can accommodate any combination of containers the total length of which is 40 feet or less. Thus, four 10-foot containers can be accommodated, two 20-foot containers, or one 40-foot container or any other combination adding up to 40 feet or less. It has been found that it is necessary to provide for at least 6 inches misalignment in any direction for a 20-foot container which is to be placed on a 40-foot trailer with another 20-foot container. For a 40-foot unit, a slightly larger misalignment may be tolerated. Though the foregoing allowances would seem to be quite large, it will be appreciated that an angular misalignment of only 1° with a 40-foot container can result in lateral misalignment of 2 inches and in a "fore-and-aft" misalignment of 5 inches.

Referring now to FIGS. 9—12, a guide plate 40 in accordance with the invention is shown. The guide plate 40 has a triangular or wedge-shaped cross section as can most clearly be seen in FIG. 10. It is made of a single sheet of material, such as steel, and may be coated with antifriction means. The triangular or wedge-shaped cross section provides sloping side walls which the containers engage when lowered toward the trailer beds. The sloping sidewalls guide the containers to their loaded positions. The use of the aforementioned antifriction means would aid in facilitating such guiding and the resultant sliding movement of the containers.

The guide plate 40 is pivotally connected to the bed 41 of a trailer or semitrailer by bolts 42 or similar means. In the schematic illustration of FIG. 12 a preferred manner of mounting the guide plate is shown in which the guide plate is pivotally connected between transverse members 43 in such a manner that it can be pivoted to a first or inoperative position out of the plane of the bed or to a second or operative position above the plane of the bed.

A specific preferred embodiment of the guide plate for use on a trailer or semitrailer as described and illustrated has a total height of 12½ inches and is mounted so that it extends approximately 10 inches above the bed when in its operative position. The base portion 44 is approximately 3 inches in cross section and the apex 45, where the ends of the metal forming the plate meet, is approximately three-quarters of an inch in cross section. With the aforesaid guide, misalignment was held to a minimum and it was found that a container could be loaded with only a crane operator and driver without the usual "spotter" previously required to direct the crane operator.

While the various features of the invention have been disclosed in conjunction with a specific embodiment chosen for purposes of illustration, it is apparent that numerous changes could be made within the scope of the inventive concepts involved and it is, accordingly, intended that the invention not be limited except by the language of the following claims.

We claim:

1. A dolly for supporting a semitrailer and connecting it to a towing vehicle for movement along substantially flat terrain, said dolly comprising chassis means including fifth wheel means for engaging a semitrailer, wheel means mounting said chassis means and including at least one pair of wheels mounted on a common axis, a pair of towing bars of equal length each having a first end pivotally connected to one end of said chassis means and a second end having pivotal engaging means for pivotal connection to a towing vehicle, each said towing bar being adapted to be manually connected to and disconnected from a towing vehicle, said first ends of said towing bars being pivotally connected to said one end of said chassis means at spaced-apart points on opposite sides of a line perpendicular to said common axis at a point midway between said pair of wheels, said spaced-apart points being at different vertical levels with respect to said chassis means, and said pivotal mounting of said first ends of said towing bars at said spaced-apart points and said different levels being such that the towing bars are adapted to be crossed for said pivotal connection to the towing vehicle so that the semitrailer will track behind the towing vehicle.

2. A dolly as claimed in claim 1, wherein each said towing bar is hollow along substantially its entire length.

3. A dolly as claimed in claim 2, wherein each said towing bar has a tensile-compression strength of at least 100,000 pounds.

4. A dolly as claimed in claim 1, wherein each said towing bar comprises a central portion in the form of a hollow steel tube.

5. A dolly as claimed in claim 4, wherein the semitrailer to be connected to a towing vehicle is approximately 40 feet long, each said towing bar is approximately 12 feet long, said semitrailer comprises kingpin means disposed approximately 11 feet from the forward end of the semitrailer for engagement with said fifth wheel means of said dolly, and said towing bars are connected to said dolly approximately 3 feet forward of the expected center of engagement of said kingpin means in said fifth wheel means.

6. A tracking trailer for freight containers for movement along substantially flat terrain, comprising an elongated flat bed for receiving freight containers, wheel means movably mounting and supporting said bed, said wheel means including at least one pair of rear wheels mounted on a first common axis fixed relative to said bed and forward wheel means rotatably connected to said bed, said forward wheel means including frame means and at least one pair of front wheels mounting said frame means, said pair of front wheels being mounted on a second common axis, a pair of towing bars of equal length each having a first end pivotally connected to one end of said frame means and a second end having pivotal engaging means for pivotal connection to a towing vehicle, each said towing bar being adapted to be manually connected to and disconnected from a towing vehicle, said first ends of said towing bars being pivotally connected to said one end of said frame means at spaced-apart points on opposite sides of a line perpendicular to said second common axis at a point midway between said pair of front wheels, said spaced-apart points being at different vertical levels with respect to said frame means, and said pivotal mounting of said first ends of said towing bars at said spaced-apart points and said different levels being such that the towing bars are adapted to be crossed for said pivotal connection to the towing vehicle so that the trailer will track behind the towing vehicle.

7. A tracking trailer for freight containers as claimed in claim 6, comprising guide plate means pivotally mounted on the trailer bed for movement between an operative position above said bed and an inoperative position below said bed, said guide plate means comprising at least one pair of guide members disposed on opposite sides of the longitudinal axis of the trailer bed, each said guide member being triangularly shaped for at least a portion of its cross section, and each said triangularly-shaped portion forming sloped guide surfaces adapted to be engaged when in said operative position by said containers and to guide said containers to desired positions relative to said trailer bed.

8. A tracking trailer for freight containers as claimed in claim 6, wherein each said towing bar is hollow along substantially its entire length.

9. A tracking trailer for freight containers as claimed in claim 8, wherein each said towing bar has a tensile-compression strength of at least 100,000 pounds.

10. A tracking trailer for freight containers as claimed in claim 6, wherein each said towing bar comprises a central portion in the form of a hollow steel tube.

11. A tracking trailer for freight containers as claimed in claim 10, wherein said tracking trailer is approximately 40 feet long, said forward wheel means is rotatably connected to said tracking trailer at a point approximately 11 feet from its forward end, each said towing bar is connected to said frame means approximately 3 feet forward of the rotatable connection of said forward wheel means to said bed, and each said towing bar is approximately 12 feet long.